(12) United States Patent
Brandwine

(10) Patent No.: US 8,539,556 B1
(45) Date of Patent: Sep. 17, 2013

(54) DISABLING ADMINISTRATIVE ACCESS TO COMPUTING RESOURCES

(75) Inventor: Eric J. Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 197 days.

(21) Appl. No.: 12/973,647

(22) Filed: Dec. 20, 2010

(51) Int. Cl.
*H04L 29/02* (2006.01)

(52) U.S. Cl.
USPC .............. 726/4; 709/225; 709/226; 719/313; 719/328

(58) Field of Classification Search
USPC .......... 726/2, 4, 28; 709/225, 226; 719/313, 719/328
See application file for complete search history.

(56) References Cited

U.S. PATENT DOCUMENTS

| 2008/0115226 A1* | 5/2008 | Welingkar et al. ............ 726/28 |
| 2008/0165789 A1* | 7/2008 | Ansari et al. ................. 370/401 |

\* cited by examiner

*Primary Examiner* — Ellen Tran
(74) *Attorney, Agent, or Firm* — Thomas | Horstemeyer, LLP

(57) ABSTRACT

Disclosed are various embodiments for disabling administrative access to computing resources. A customer request is obtained to disable administrative access of a provider to one or more computing devices. The provider supplies computing resources of the at least one computing device to the customer. The administrative access of the provider to the computing devices is disabled in response to the request. The administrative access of the provider remains disabled until a reset of the computing devices is performed.

23 Claims, 4 Drawing Sheets

DISABLING ADMINISTRATIVE ACCESS TO COMPUTING RESOURCES

BACKGROUND

Computing resources are often administered by multiple groups. As an example, an entity may have one team in charge of maintaining computing infrastructure and another team in charge of maintaining a service hosted on the computing infrastructure. As another example, one company may use computing resources that are hosted on computing infrastructure owned and maintained by another company. The group in charge of the computing infrastructure may retain administrative access to the infrastructure for maintenance, support, and other purposes. To illustrate, the group in charge of the computing infrastructure may disable accounts of malicious users, install security patches and other software updates, diagnose and correct resource availability issues, inspect data to ensure legal and contractual compliance, and/or perform other administrative tasks.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to disabling administrative access to computing resources. For a variety of reasons, a customer who obtains computing resources from a provider entity may wish to disable access to the computing resources by administrative users and/or other users associated with the provider entity. The provider entity may agree to a loss of control, so long as control may be regained, for example, through a hardware reset or software reset of the computing resources. To this end, various embodiments of the present disclosure facilitate the disabling of administrative privileges such that the privileges may be regained by provider entity only through interrupting the operation of the computing resources. In the following discussion, a general description of the system and its components is provided, followed by a discussion of the operation of the same.

Figure 1:
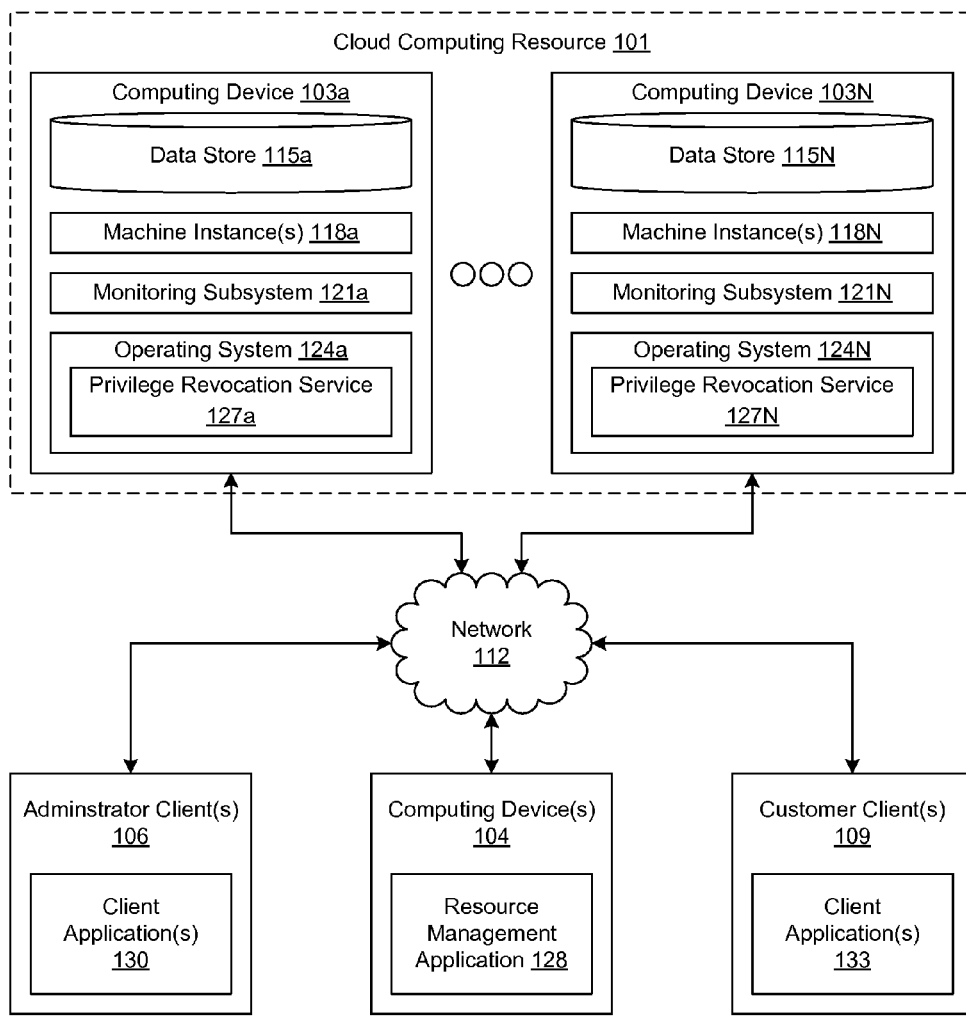
FIG. 1 is a drawing of a networked environment according to various embodiments of the present disclosure.

With reference to FIG. 1, shown is a networked environment 100 according to various embodiments. The networked environment 100 includes a cloud computing resource 101 comprising a networked plurality of computing devices 103a ... 103N. The networked environment 100 also includes one or more computing devices 104, one or more administrator clients 106, and one or more customer clients 109. The cloud computing resource 101, the computing device(s) 104, the administrator client(s) 106, and the customer client(s) 109 are in data communication by way of a network 112. The network 112 includes, for example, the Internet, intranets, extranets, wide area networks (WANs), local area networks (LANs), wired networks, wireless networks, or other suitable networks, etc., or any combination of two or more such networks.

The cloud computing resource 101 may comprise a multitude of networked computing devices 103. The cloud computing resource 101 may be controlled and managed by a provider entity that provides access to resources of the cloud computing resource 101 to customers for a fee under a utility computing model. The term "cloud computing resource" is not intended to be limiting. It is understood that the cloud computing resource 101, as used herein, may refer to any plurality of networked computing devices 103.

In some embodiments, the computing devices 103 may correspond to storage nodes that provide a data storage service to customers. In other embodiments, the computing devices 103 may be executing instances of virtual machines providing general computing capability to customers. Customers may be capable of terminating machine instances or launching machine instances whenever they desire, thereby providing an elastic computing resource. Accordingly, customer applications executed in an elastic computing resource may be scaled as desired to handle practically any level of peak demand.

Each computing device 103 may comprise, for example, a server computer or any other system providing computing capability. The computing devices 103 may be employed, for example, in one or more server banks or computer banks or other arrangements. For example, a plurality of computing devices 103 together may comprise a cloud computing resource 101, a grid computing resource, a storage network, and/or any other distributed computing arrangement. Such computing devices 103 may be located in a single installation or may be distributed among many different geographical locations. For purposes of convenience, each computing device 103 is referred to herein in the singular. Even though each computing device 103 is referred to in the singular, it is understood that a plurality of computing devices 103 may be employed in the various arrangements as described above.

The computing devices 103 may correspond to differing hardware platforms in various embodiments. Accordingly, the computing devices 103 may have differing hardware configurations of resources, for example, of central processing units (CPUs) that provide general-purpose processing resources, graphics processing units (GPUs) that provide graphics processing resources, system memory, data storage characteristics such as capacity, storage bandwidth, and storage input/output operations per second (IOPS), network bandwidth, and/or other hardware characteristics.

Various applications and/or other functionality may be executed in each computing device 103 according to various embodiments. Also, various data may be stored in a respective data store 115 that is accessible to the corresponding computing device 103. The data store 115 may be representative of a plurality of data stores 115 as can be appreciated. The data stored in the data store 115, for example, may be associated with the operation of the various applications and/or functional entities described below.

The components executed on each computing device 103, for example, include one or more machine instances 118, a monitoring subsystem 121, an operating system 124, a privilege revocation service 127, and other applications, services, processes, systems, engines, or functionality not discussed in detail herein. Each machine instance 118 may be executed to provide a virtualized computing environment for a customer. A machine instance 118 may correspond to the resources of an actual machine or to a virtual machine.

A virtual machine instance 118 is a virtualized computer system, or a software implementation of a physical computing system. Virtual machines may provide for multiple and/or different operating system environments to run concurrently on a single system having a processor circuit and a memory. As a non-limiting example, multiple machine instances 118 of a Linux® operating system 124 environment may execute concurrently with multiple machine instances 118 of a Microsoft® Windows® operating system 124 environment on a single system. A machine instance 118 may include a commercially available hypervisor, or virtual-machine monitor, such as, for example, Xen®, VMware®, Hyper-V™, and/or other hypervisors.

Each machine instance 118 may be controlled by different respective customers, who may have access only to their own machine instance(s) 118 and no access to the machine instances 118 of other customers. Multiple machine instances 118 may execute concurrently on a computing device 103 including parallel processors. Multiple machine instances 118 also may appear to execute concurrently on a multi-threaded computing device 103 with fewer processors than instances. In some embodiments, a customer may have exclusive access to the resources of a particular computing device 103, and a machine instance 118 model may optionally be employed. In other embodiments, a customer may share access to the resources of a particular computing device 103 with other customers by way of a virtual machine instance 118 model as described above.

The monitoring subsystem 121 may be executed in a computing device 103 for the purposes of monitoring the status and resource usage of the respective computing device 103. For example, the monitoring subsystem 121 may monitor metrics relating to memory usage, processor usage, network bandwidth usage, data storage usage, system health, billable usage, and/or other metrics. The monitoring subsystem 121 may be configured to report metrics to a central server and/or generate system alerts to be sent to administrators. Such metrics may be used by administrators to identify malicious or out-of-control applications, whereupon the administrators may take corrective action to preserve the integrity of the cloud computing resource 101. Further, the metrics generated by the monitoring subsystem 121 may be used to determine whether a customer is in compliance with legal and/or contractual requirements. The monitoring subsystem 121 may also be used to determine whether the level of service provided to the customer is in compliance with established service-level agreements. In various embodiments, the monitoring subsystem 121 may continue to execute irrespective of whether the access of administrators to the computing device 103 has been revoked.

The operating system 124 corresponds to an operating system of the computing device 103. The operating system 124 may correspond, for example, to Linux®, FreeBSD®, OpenBSD, Microsoft® Windows®, MacOS®, and/or other operating systems 124. It is understood that additional instances of operating systems 124 may be executed in the computing device 103 in association with the machine instances 118.

The privilege revocation service 127 is executed in conjunction with the operating system 124 of the computing device 103 to restrict administrative access to the computing device 103 after a customer revokes one or more privileges of the administrators. After administrative access is disabled by the privilege revocation service 127, the administrators cannot regain access without interrupting the operation of the computing device 103, for example, by performing a hardware reset or software reset of the computing device 103. The privilege revocation service 127 may revoke such privileges as interactive login capability for one or more administrative users, the capability of administrative users to gain "root" (or super user) privileges once logged in, the capability to perform various hypervisor operations, the capability to inspect data in the data store 115, the capability to view information about customer network connections, and/or other administrative privileges.

The computing device 104 may comprise, for example, a server computer or any other system providing computing capability. Alternatively, a plurality of computing devices 104 may be employed that are arranged, for example, in one or more server banks or computer banks or other arrangements. For example, a plurality of computing devices 104 together may comprise a cloud computing resource, a grid computing resource, and/or any other distributed computing arrangement. Such computing devices 104 may be located in a single installation or may be distributed among many different geographical locations. For purposes of convenience, the computing device 104 is referred to herein in the singular. Even though the computing device 104 is referred to in the singular, it is understood that a plurality of computing devices 104 may be employed in the various arrangements as described above.

Various applications and/or other functionality may be executed in the computing device 104 according to various embodiments. The components executed on the computing device 104, for example, include a resource management application 128 and other applications, services, processes, systems, engines, or functionality not discussed in detail herein. The resource management application 128 is executed to provide a control layer for the cloud computing resource 101. For example, the resource management application 128 may assign customers to particular computing devices 103 in the cloud computing resource 101. Also, the resource management application 128 may include a network-based interface for customers to control and manage their computing resources in the cloud computing resource 101.

The administrator client 106 and the customer client 109 are each representative of a plurality of client devices that may be coupled to the network 112. The administrator client 106 and the customer client 109 may each comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The administrator client 106 and the customer client 109 may each include display devices such as cathode ray tubes (CRTs), liquid crystal display (LCD) screens, gas plasma-based flat panel displays, LCD projectors, or other types of display devices, etc.

The administrator client 106 may be configured to execute various applications such as one or more client applications 130 and/or other applications. Similarly, the customer client 109 may be configured to execute various applications such as one or more client applications 133 and/or other applications. The client applications 130 and 133 may correspond to any application capable of providing access to the resources of the computing device 103. As non-limiting examples, the client applications 130, 133 may correspond to telnet applications, secure shell (SSH) applications, remote desktop applications, virtual network computing (VNC) applications, and so on. In various embodiments, the client application 130 and/or 133 may correspond to an automated application that does not involve direct user interaction. The administrator client 106 and the customer client 109 may be configured to execute applications beyond client applications 130, 133 such as, for example, browser applications, file transfer applications, email applications, instant message applications, and/or other applications.

Next, a general description of the operation of the various components of the networked environment 100 is provided. To begin, a customer of the entity that operates the cloud computing resource 101 establishes an account and obtains access to computing resources hosted on one or more computing devices 103 of the cloud computing resource 101. The customer may contract for exclusive access or non-exclusive access to one or more of the computing devices 103.

The customer may be provided with a feature allowing the customer to disable administrative access to the computing devices 103. Such a feature may be included with a plan selected by the customer or may be a separately purchaseable feature. A customer may want to enable such a feature for a variety of reasons. As non-limiting examples, the customer may want to maintain the privacy of data stored in the computing device 103, prevent automated software updates from being applied, prevent unauthorized access, prevent the potential installation of malicious software, and so on.

The customer and the entity that operates the cloud computing resource 101 may correspond to divisions of the same entity. For example, the customer may correspond to a development team, while the provider entity may correspond to an information technology administration team. Further, the entity that operates the cloud computing resource 101 may correspond to an outsourced system administration provider, while the cloud computing resource 101 may be owned by the customer. Therefore, it is understood that the principles of the present disclosure may be applied to many different contractual arrangements where the customer may wish to revoke privileges of administrative users and/or automated administrative processes.

If the customer has permission to disable administrative access, the customer may provide a request to the privilege revocation service 127 to effect administrative privilege revocation. Such a request may be sent manually or automatically from a customer client 109 and/or may be configured automatically on the computing device 103, for example, through a boot script of a machine instance 118 or under the direction of the resource management application 128. Where a separate control layer is employed for the cloud computing resource 101, the customer may send the request to the resource management application 128 executed in the computing device 104. The resource management application 128 may then configure the appropriate computing devices 103 to effect the administrative privilege revocation. The privilege revocation service 127 and/or the resource management application 128 may evaluate whether the customer has permission to disable administrative access before acting on the request.

The privilege revocation service 127 may function as a privileged process of the operating system 124. For example, the privilege revocation service 127 may execute under the authority of a super user in order to access kernel space. Thus, the privilege revocation service 127 may be given access to the operating system 124 in order to disable certain functions or privileges relating to administrative use. In various embodiments, the privilege revocation service 127 may be implemented through the use of a pluggable authentication module (PAM), a plug-in to Xen® or another hypervisor application, access control policies under security-enhanced Linux (SELinux), custom code, and so on.

The privilege revocation service 127 is configured to disable one or more administrative privileges in response to a customer request. The administrative privileges remain disabled until the operation of the computing device 103 is interrupted such as, for example, by a hardware reset, a power cycling, a software reset, etc. That is, an administrator is unable to regain the disabled privileges until a reset or other form of system interruption occurs. In some embodiments, the customer (but not the administrator) may be able to restore the administrative privileges without rebooting. In various embodiments, the customer may retain some or all administrative privileges even though the administrative privileges of the administrator are revoked.

It is understood that administrative privileges may include various types of privileges that may be separately disabled by the customer. For example, the privilege revocation service 127 may limit the ability of the administrative user to become root or administrator of the computing device 103 once logged in. To this end, various approaches to becoming root or administrator may be permanently disabled in the operating system 124 in order for the privilege revocation service 127 to control the privilege more easily and securely.

Various audit controls may be employed to ensure that the privilege revocation service 127 functions as intended. For instance, the code that implements the privilege revocation service 127 may be subjected to a thorough audit to ensure it will perform correctly. In addition, various operations performed by the privilege revocation service 127 may be logged for auditing purposes. Such logs may be correlated with logs of other services executed in the computing device 103 to ensure that administrators are not regaining privileges while the computing device 103 is operating in an uninterrupted state.

The monitoring subsystem 121 may be configured to monitor various characteristics of a computing device 103 regardless of whether administrative privileges are revoked. Metrics may be reported back to administrative users or to a central server for aggregation. Alerts may be sent to administrative users when a value reported by the monitoring subsystem 121 is outside of a specified range. In some embodiments, the monitoring capabilities of the monitoring subsystem 121 may be established and/or limited by customers.

Figure 2:
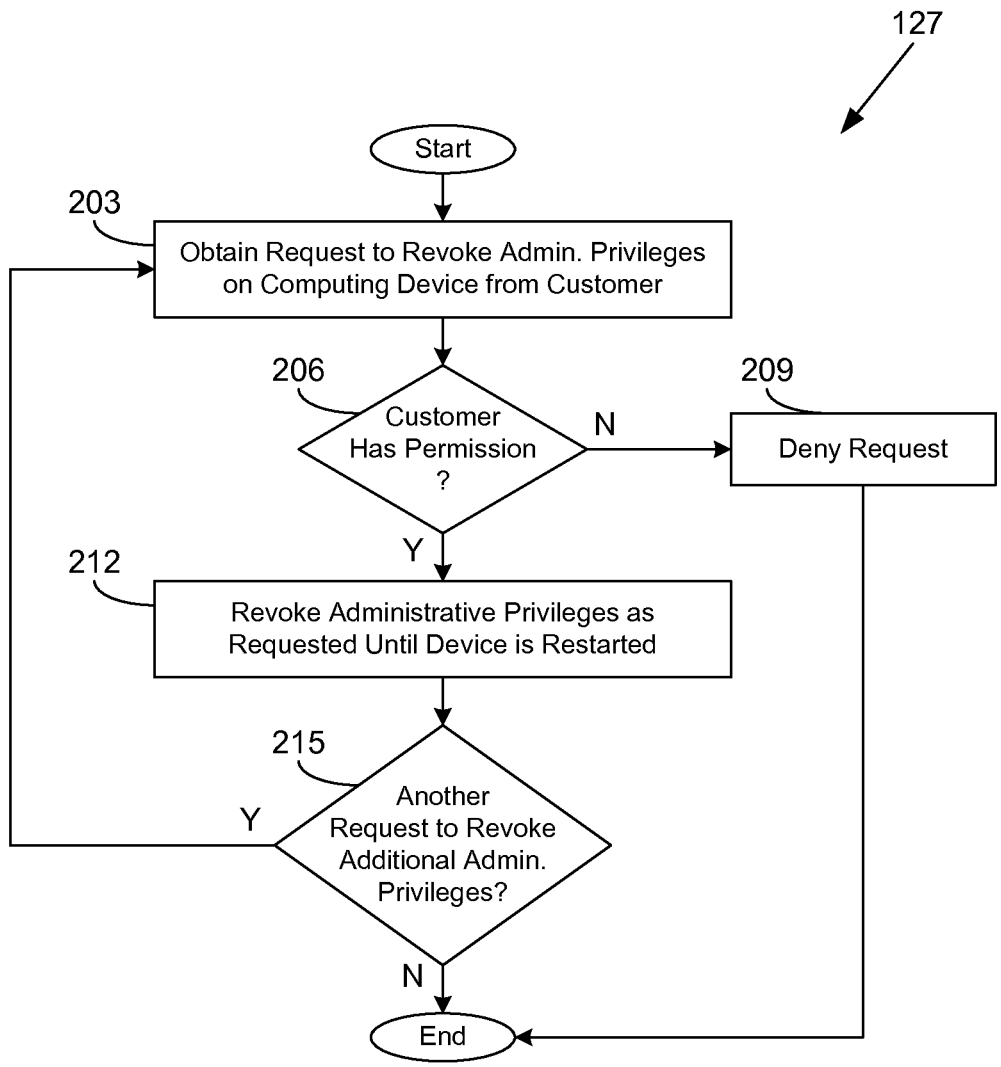
FIGS. 2 and 3 are flowcharts illustrating examples of functionality implemented as portions of a privilege revocation service executed in a computing device in the networked environment of FIG. 1 according to various embodiments of the present disclosure.

Referring next to FIG. 2, shown is a flowchart that provides one example of the operation of a portion of the privilege revocation service 127 according to various embodiments. It is understood that the flowchart of FIG. 2 provides merely an example of the many different types of functional arrangements that may be employed to implement the operation of the portion of the privilege revocation service 127 as described herein. As an alternative, the flowchart of FIG. 2 may be viewed as depicting an example of steps of a method implemented in the computing device 103 (FIG. 1) according to one or more embodiments.

Beginning with box 203, the privilege revocation service 127 obtains a request from a customer client 109 (FIG. 1) to revoke administrative privileges on a computing device 103. For example, a customer may have typed a command, selected a program icon, selected a checkbox, and/or otherwise interacted with the client application 133 (FIG. 1) in order to generate the request. In some embodiments, the customer client 109 may send a request to the resource management application 128 (FIG. 1) in the computing device 104 (FIG. 1), which in turn configures the privilege revocation service 127 to revoke the administrative privileges. Further, where the customer interacts with the resource management application 128 instead of directly with the computing device 103, the customer may not be aware of the identity of the particular computing device 103 in the cloud computing resource 101 (FIG. 1). In box 206, the privilege revocation service 127 determines whether the customer has permission to disable administrative access. In some embodiments, this determination may be performed by the resource management application 128.

In some embodiments, the ability to disable administrative access to a computing device 103 may correspond to a customer-purchasable feature. Thus, the privilege revocation service 127 may ensure that an account associated with the customer has purchased the feature or is able to purchase the feature. In addition, the ability to disable administrative access may be absent for some computing devices 103 in the cloud computing resource 101 and/or may be disabled for customers who are not trusted. Further, permission to disable administrative privileges may be granted or disabled on a per-privilege basis, and the request may be evaluated against a permissions table associated with the customer.

If the privilege revocation service 127 determines that the customer does not have permission to disable administrative privileges, the privilege revocation service 127 proceeds to box 209 and denies the request. A notification of the denial may be sent to the customer client 109. Thereafter, the portion of the privilege revocation service 127 ends. If, instead, the privilege revocation service 127 determines that the customer does have permission to disable administrative privileges as requested, the privilege revocation service 127 proceeds to box 212.

In box 212, the privilege revocation service 127 revokes the administrative privileges as requested. The revocation may remain in place on the computing device 103 until the computing device 103 is restarted by a hardware reset, a power cycling, or another event that interrupts the operation of the computing device 103. In one embodiment, the customer may be able to restore the revoked administrative privileges without resetting or rebooting the computing device 103. However, it is understood that the administrative users are not able to regain the revoked administrative privileges without interrupting the operation of the computing device 103.

In box 215, the privilege revocation service 127 determines whether there is another pending request to revoke administrative privileges on the computing device 103. For example, the customer may generate a subsequent request to disable other administrative privileges that were not disabled in the preceding request. If another request is to be handled, the privilege revocation service 127 returns to box 203 and obtains the subsequent request. Otherwise, the portion of the privilege revocation service 127 ends.

Figure 3:
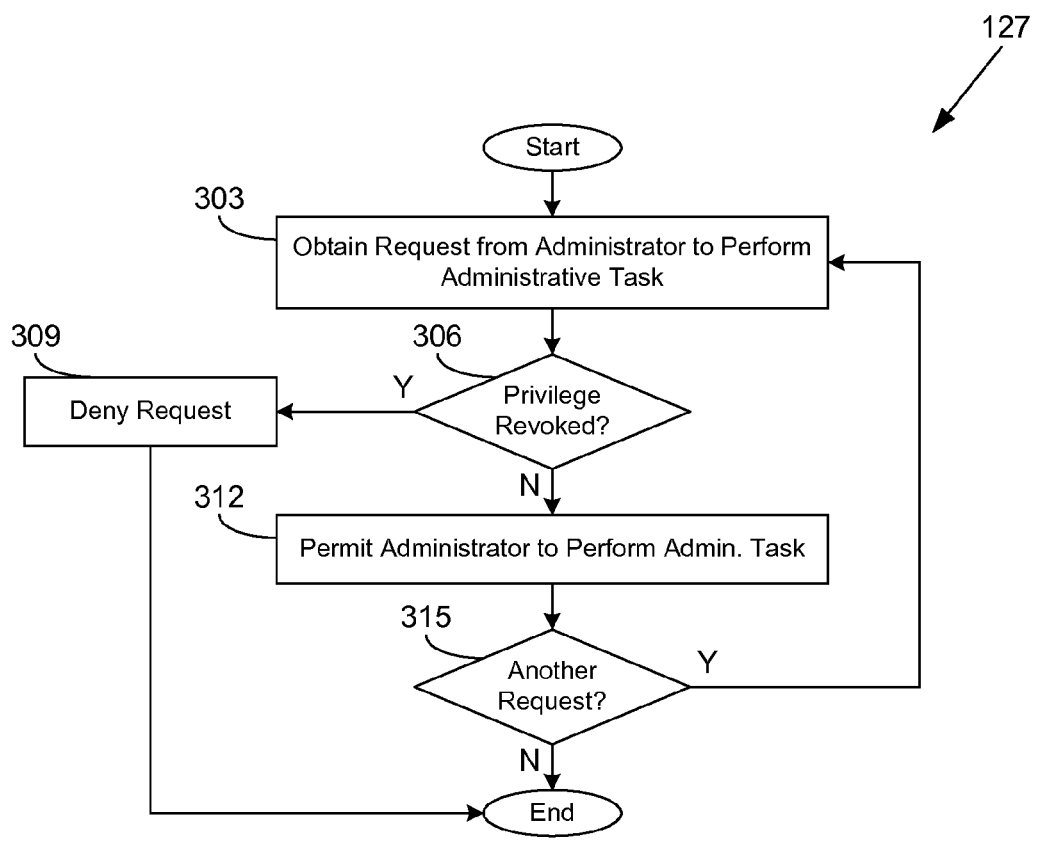

Continuing on to FIG. 3, shown is a flowchart that provides another example of the operation of another portion of the privilege revocation service 127 according to various embodiments. It is understood that the flowchart of FIG. 3 provides merely an example of the many different types of functional arrangements that may be employed to implement the operation of the portion of the privilege revocation service 127 as described herein. As an alternative, the flowchart of FIG. 3 may be viewed as depicting an example of steps of a method implemented in the computing device 103 (FIG. 1) according to one or more embodiments.

Beginning with box 303, the privilege revocation service 127 obtains a request from an administrative user at an administrator client 106 (FIG. 1) to perform some task that requires an administrative privilege. As non-limiting examples, the administrative user may wish to perform an interactive login, gain super-user privileges after logging in, inspect the contents of the data store 115 (FIG. 1), or other privileged operations. Further, the administrative user may wish to perform a hypervisor operation such as, for example, starting a machine instance 118 (FIG. 1), stopping a machine instance 118, copying a machine instance 118, inspecting the memory of machine instances 118, and so on.

In box 306, the privilege revocation service 127 determines whether the task is associated with a privilege that has been revoked. If the task is associated with a privilege that has been revoked, the privilege revocation service 127 proceeds to box 309 and denies the request. A notification of the denial may be sent to the administrative user at the administrator client 106. In addition, a record of the denial may be added to an audit log. Thereafter, the portion of the privilege revocation service 127 ends. Otherwise, if the task is not associated with a revoked privilege, the privilege revocation service 127 continues to box 312.

In box 312, the privilege revocation service 127 permits the administrator client 106 to perform the requested task in the computing device 103. In box 315, the privilege revocation service 127 determines whether another request to perform an administrative task is pending. If another request is pending, the privilege revocation service 127 returns to box 303 and processes the subsequent request. If another request is not pending, the portion of the privilege revocation service 127 ends.

Figure 4:
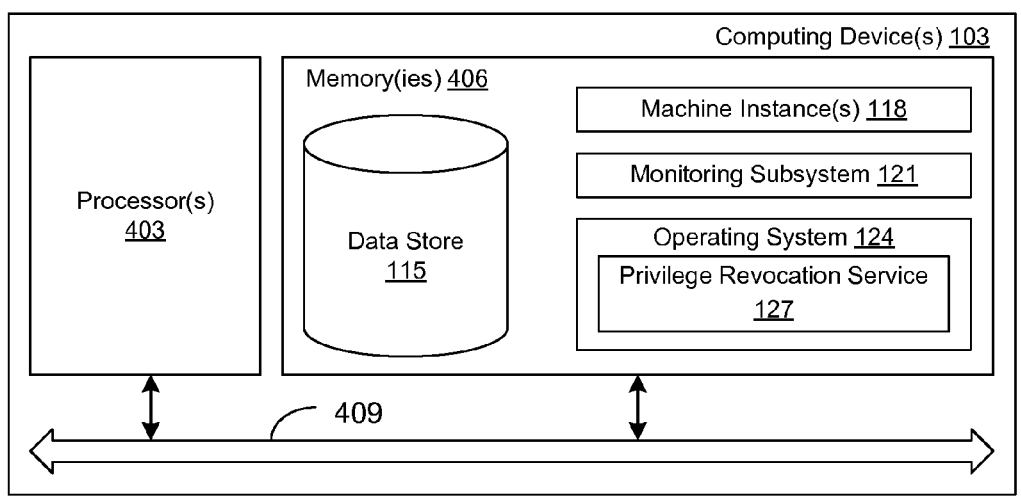
FIG. 4 is a schematic block diagram that provides one example illustration of a computing device employed in the networked environment of FIG. 1 according to various embodiments of the present disclosure.

With reference to FIG. 4, shown is a schematic block diagram of a representative computing device 103 employed in the cloud computing resource 101 (FIG. 1) according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the machine instance(s) 118, the monitoring subsystem 121, the operating system 124, the privilege revocation service 127, and potentially other applications. Also stored in the memory 406 may be a data store 115 and other data.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 112 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the machine instance(s) 118, the monitoring subsystem 121, the operating system 124, the privilege revocation service 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the privilege revocation service 127. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the machine instance(s) 118, the monitoring subsystem 121, the operating system 124, and the privilege revocation service 127, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:

code that obtains a request from a customer of an entity to disable administrative access to at least one server computing device in a networked plurality of computing devices, wherein the customer has contracted with the entity for use of at least one computing resource of the at least one server computing device in the networked plurality of computing devices for a fee;
code that determines whether the customer has permission to disable the administrative access to the at least one server computing device;
code that disables the administrative access to the at least one server computing device in response to the request when the customer has permission;
wherein the administrative access to the at least one server computing device remains irrevocably disabled until a reset of the at least one server computing device is performed;
wherein an interactive login capability for at least one administrative user is disabled when the administrative access is disabled; and
wherein an administrative monitoring subsystem of the at least one server computing device remains active when the administrative access is disabled.

2. A system, comprising:
at least one server computing device; and
a privilege revocation service executable in the at least one server computing device, the privilege revocation service comprising:
logic that obtains a request from a user associated with a first organization to revoke at least one privilege of an administrator of the at least one server computing device who is associated with a second organization that provides computing resources of the at least one server computing device to the first organization;
logic that revokes the at least one privilege in response to the request; and
wherein the administrator is capable of regaining the at least one privilege only through performing a reset of the at least one server computing device.

3. The system of claim 2, wherein the logic that revokes is configured to revoke the at least one privilege of all administrators of the at least one server computing device in response to the request, and the user is not an administrator.

4. The system of claim 2, wherein the first organization obtains computing resources of the at least one server computing device from the second organization for a fee.

5. The system of claim 4, wherein the second organization provides the first organization with exclusive use of the computing resources of the at least one server computing device.

6. The system of claim 4, wherein the second organization provides the first organization and at least one other organization with non-exclusive use of the computing resources of the at least one server computing device.

7. The system of claim 4, wherein the at least one server computing device includes at least one machine instance used by the first organization in a networked plurality of computing devices.

8. The system of claim 4, wherein a capability to revoke the at least one privilege corresponds to a feature that is purchaseable from the second organization by the first organization.

9. The system of claim 2, wherein the first organization and the second organization are units of a single business entity that manages and uses the at least one server computing device.

10. The system of claim 2, wherein the at least one privilege includes an interactive login capability for the administrator.

11. The system of claim 2, wherein the at least one privilege includes an administrative access capability for the administrator.

12. The system of claim 2, wherein the at least one privilege includes a hypervisor operation capability for the administrator.

13. The system of claim 2, wherein the logic that revokes further comprises:
logic that determines whether the user has permission to revoke the at least one privilege; and
wherein the at least one privilege is revoked only when the user has permission.

14. The system of claim 2, wherein the privilege revocation service further comprises:
logic that obtains a request from the administrator to perform at least one task;
logic that determines whether the at least one task requires the at least one privilege; and
logic that denies the request when the at least one privilege is revoked.

15. A method, comprising the steps of:
obtaining a request from a customer to disable administrative access of a provider to at least one server computing device, wherein the provider supplies computing resources of the at least one server computing device to the customer;
disabling the administrative access of the provider to the at least one server computing device in response to the request; and
wherein the administrative access of the provider to the at least one server computing device remains disabled until a reset of the at least one server computing device is performed.

16. The method of claim 15, further comprising the steps of:
obtaining, in the at least one server computing device, a request from the provider to perform an operation that requires the administrative access to the at least one server computing device; and
denying, in the at least one server computing device, the request when the administrative access has been disabled.

17. The method of claim 15, further comprising the step of denying, in the at least one server computing device, the request when the customer has not purchased an administrative access disabling feature.

18. The method of claim 15, wherein an administrative monitoring subsystem of the at least one server computing device remains active when the administrative access is disabled.

19. The method of claim 18, wherein the administrative monitoring subsystem is configured to monitor at least one metric selected from the group consisting of: a processor usage metric, a network bandwidth consumption metric, a memory consumption metric, a data storage consumption metric, a billable usage metric, and a system health metric.

20. The method of claim 15, wherein an interactive login capability for at least one administrator is disabled when the administrative access is disabled.

21. The method of claim 15, wherein the customer has contracted for exclusive use of at least one resource of the at least one server computing device from the provider.

22. The method of claim 15, further comprising the step of restoring the administrative access of the provider to the at least one server computing device in response to a subsequent request by the customer.

23. The method of claim 15, wherein the administrative access comprises at least one of: an interactive login capability or a hypervisor operation capability.

* * * * *